(No Model.) 5 Sheets—Sheet 1.

L. MILLER.
GRAIN SHOCKING ATTACHMENT FOR HARVESTERS.

No. 414,776. Patented Nov. 12, 1889.

Attest
Geo. T. Smallwood.
Lewis Frech.

Inventor:
Lewis Miller.
By A. H. Smith & Son,
Attorneys.

(No Model.)  5 Sheets—Sheet 3.

L. MILLER.
GRAIN SHOCKING ATTACHMENT FOR HARVESTERS.

No. 414,776. Patented Nov. 12, 1889.

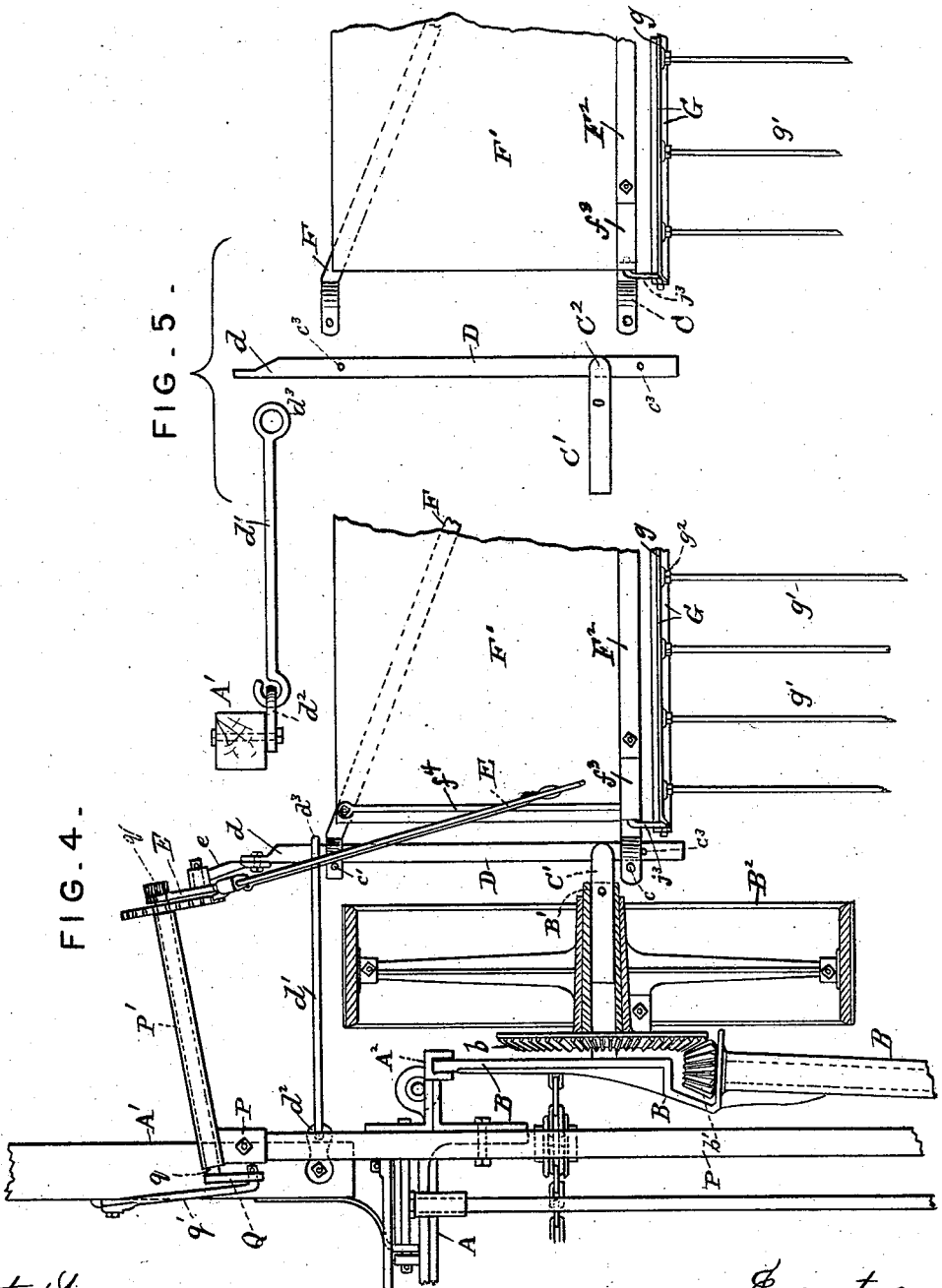

(No Model.) 5 Sheets—Sheet 5.

L. MILLER.
GRAIN SHOCKING ATTACHMENT FOR HARVESTERS.

No. 414,776. Patented Nov. 12, 1889.

Attest:
Geo. T. Smallwood.
Lewis Trick.

Inventor:
Lewis Miller,
By A. H. Smith & Son,
Attorneys.

UNITED STATES PATENT OFFICE.

LEWIS MILLER, OF AKRON, OHIO.

GRAIN-SHOCKING ATTACHMENT FOR HARVESTERS.

SPECIFICATION forming part of Letters Patent No. 414,776, dated November 12, 1889.

Application filed December 15, 1888. Serial No. 293,738. (No model.)

*To all whom it may concern:*

Be it known that I, LEWIS MILLER, of Akron, county of Summit, and State of Ohio, have invented a new and useful Improvement in Grain-Shocking Attachments for Harvesters, of which the following is a full, clear, and exact description, reference being had to the accompanying drawings, making part of this specification.
My invention relates to an attachment for harvesting-machines for receiving the bundles as they are discharged from said machine, and upon which the bundles are by an attendant formed into a shock and then deposited and left standing in such form on the ground.

The nature of my improvement will be understood from the following description and claims, reference being had to the accompanying drawings, in which—

Figure 1:
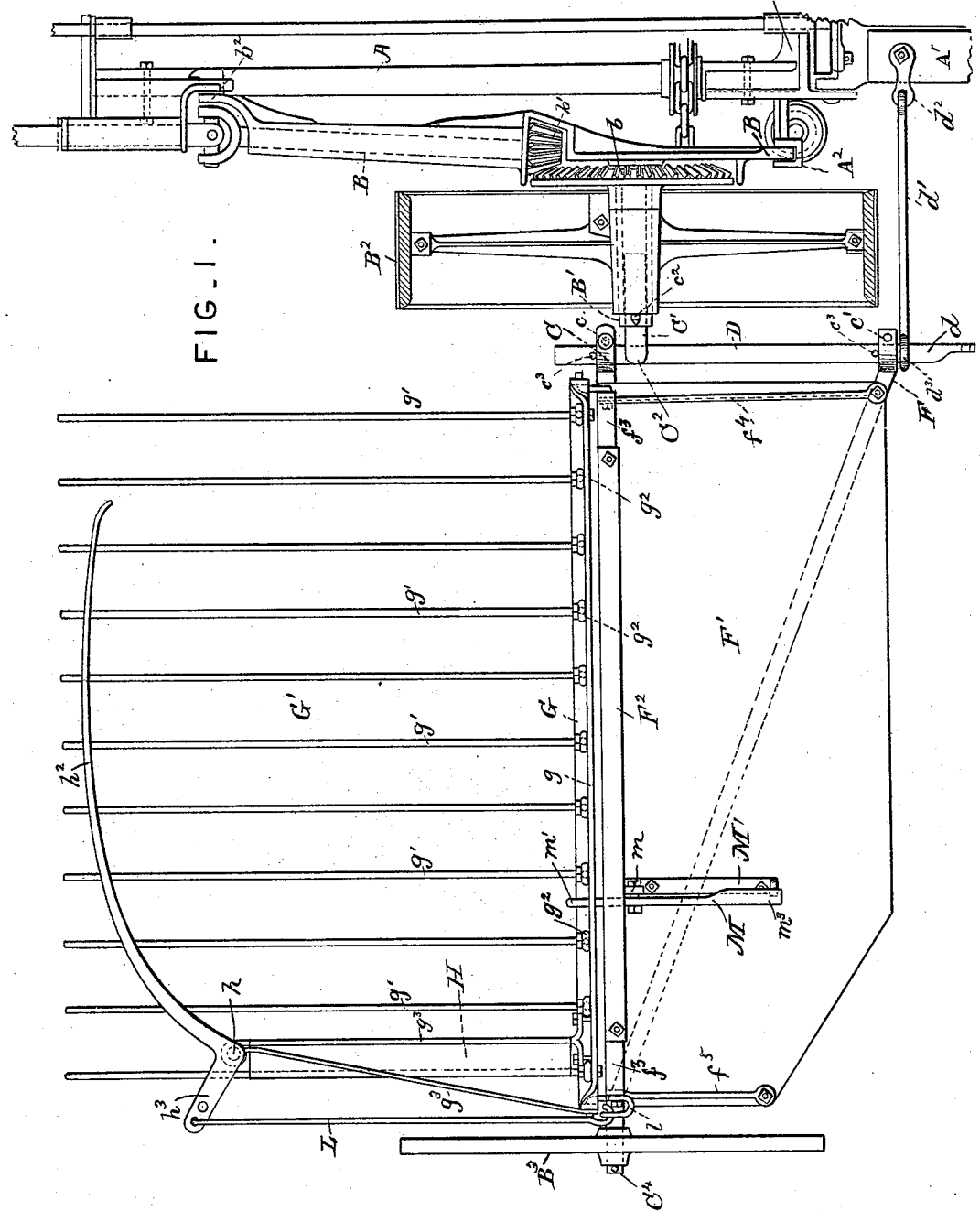
Figure 2:
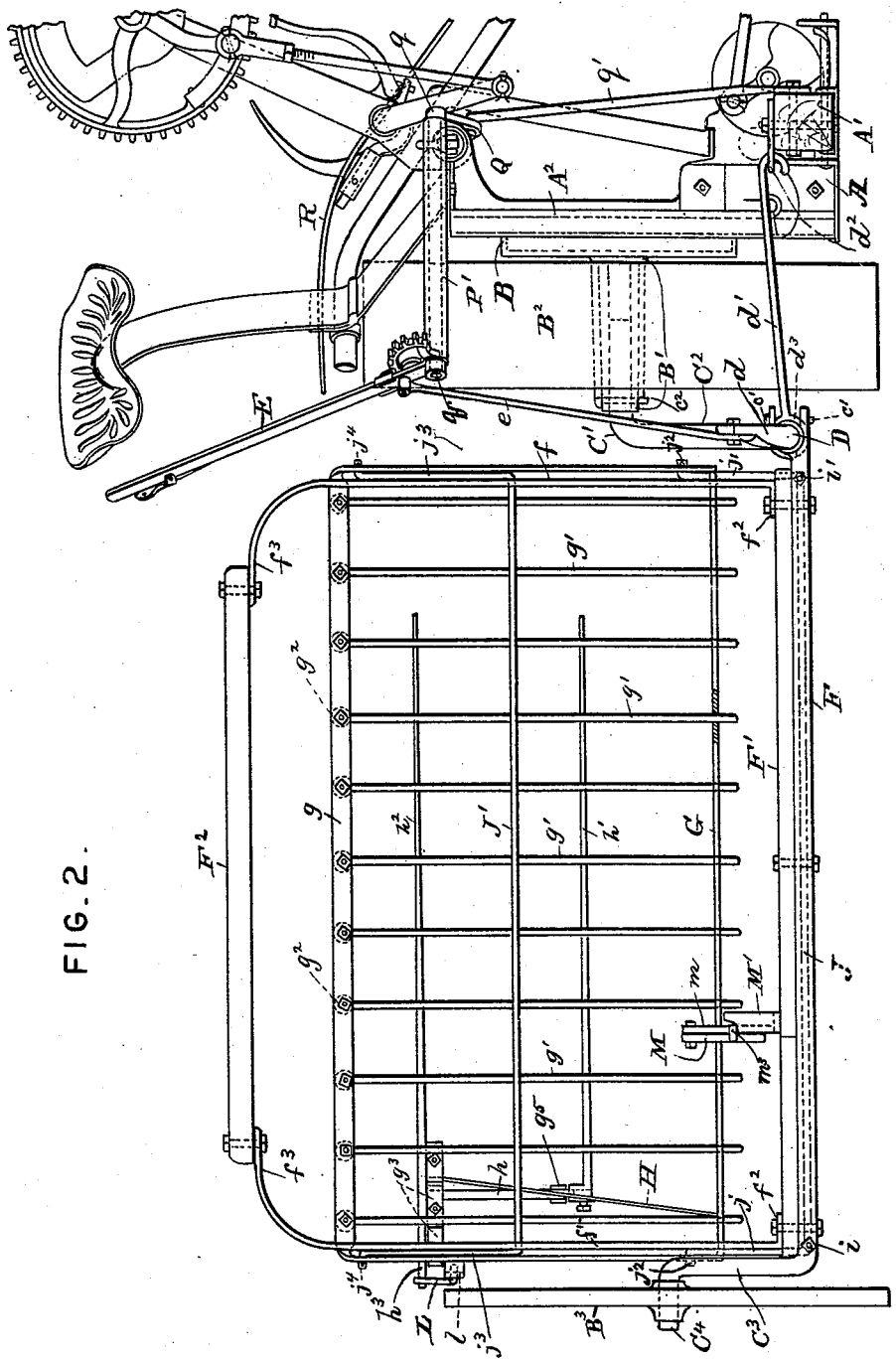
Figure 3:
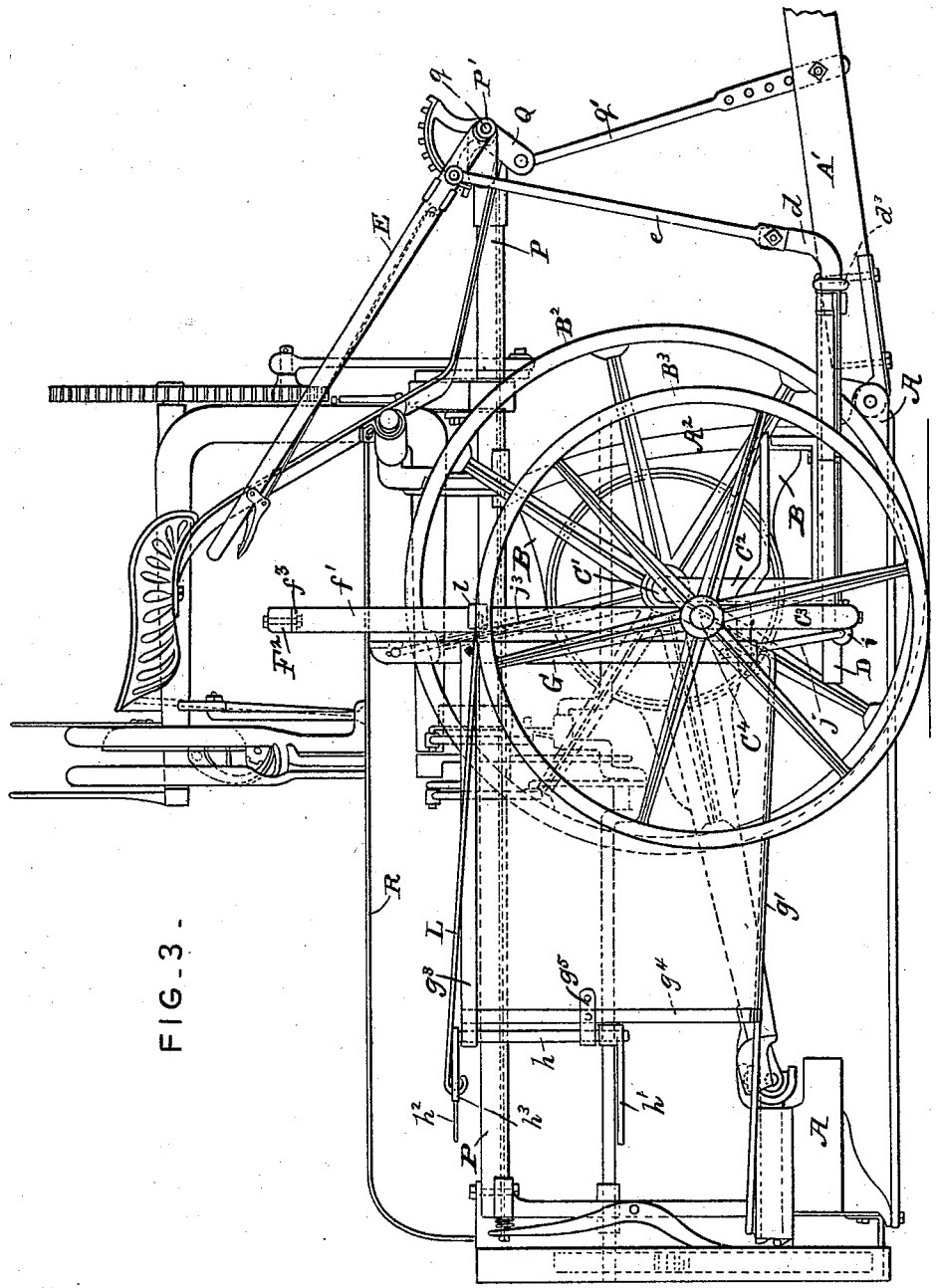
Figure 6:
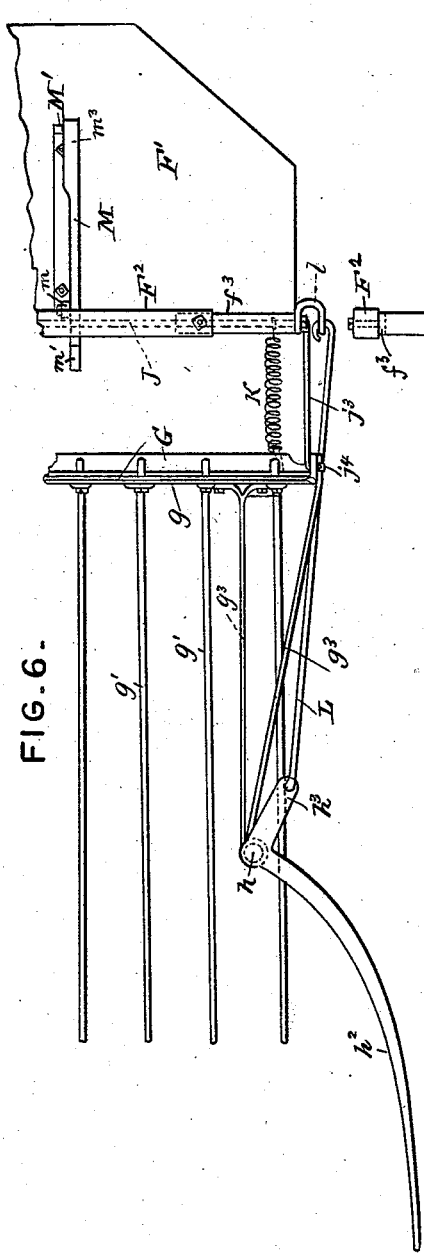
Figure 7:
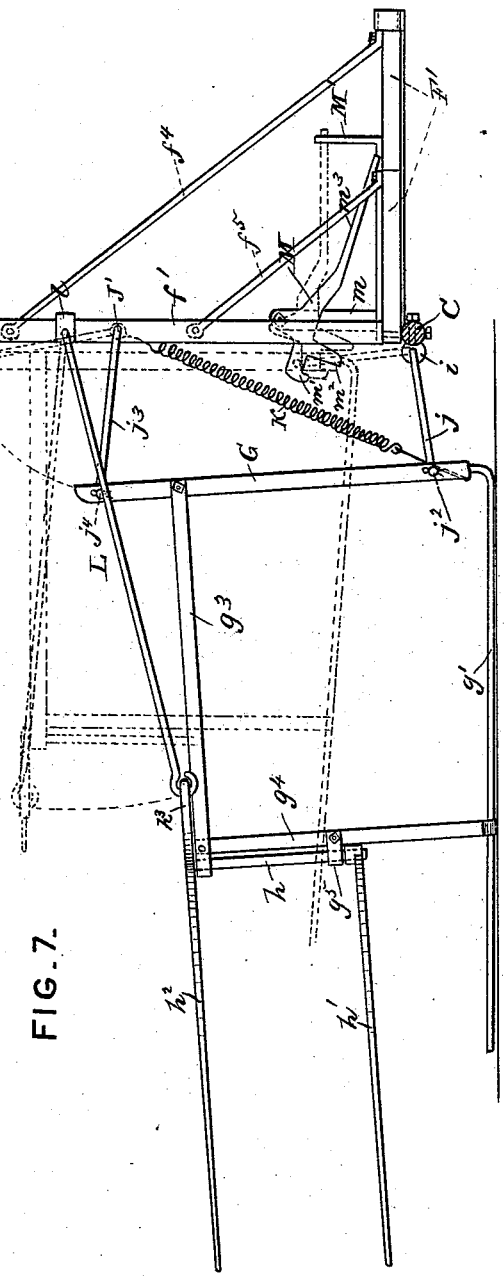

Figure 1 is a plan view of my improved shocking attachment and so much of the harvester as is necessary to show the relation of the attachment thereto. Fig. 2 is a front elevation of the same, showing, also, the arrangement of the driver's seat, means for adjusting the frame, &c., and a portion of the binder frame and mechanism. Fig. 3 is a stubble-side elevation of the parts shown in Fig. 2. Fig. 4 is a plan view, partly broken away, similar to Fig. 1, with the adjusting-lever, &c., added; Fig. 5, views of parts shown in Fig. 4 detached. Fig. 6 is a plan view showing the outer end of the shocker attachment in the position the parts assume in discharging or depositing a shock; and Fig. 7 is a side elevation of the same, showing in full lines the parts in the position shown in Fig. 6 and in dotted lines the position of the tray when receiving the bundle.

A indicates a portion of the main frame of the harvesting-machine; A', the tongue or draft attachment hinged thereto; B, the wheel-frame or tubular arm carrying the secondary or counter shaft, carrying the pinion $b'$ at its front end, and hinged at its rear end to the grain side of the main frame at $b^2$, its forward end being expanded in width (vertically) and engaging a grooved standard $A^2$ on the main frame for guiding and steadying the latter in its adjustment for changing the height of the cut, &c., in a manner well understood.

The wheel-frame B has the main axle B' formed integral with it and projecting from its outer side in rear of its forward end, and upon which the main drive-wheel $B^2$ and main bevel-gear $b$, rigid with $B^2$, are mounted and rotate. The axle B' is made hollow or tubular in form, and by preference tapering toward its outer end, to receive and support the inner end of my bundle carrier and shocker, which consists as follows: A crank-axle or axle-bar C has at its inner end the horizontal arm C', which is inserted in the hollow end of the axle B', and is secured to it by means of a pin or key $c^2$ or other suitable fastening, holding said parts connected, but permitting the arm C' to be readily and easily disconnected from the axle B' when desired. The bar C may be formed in one piece with the crank portion $C^2$ and arm C' at its inner end, and also with the crank portion $C^3$ and journal-arm $C^4$, on which the carrying-wheel $B^3$ is journaled at its outer end, if desired; but for convenience in attaching, detaching, and adjusting the bundle-carrier it is preferred to connect the lower end of the crank-arm $C^2$ rigidly with a longitudinally-arranged rod or bar D, which extends forward of the arm $C^2$ and has its forward end $d$ upturned in runner form and connected by a link $e$ with the lever E, by means of which the main frame is adjusted, as will appear.

The bar D at a point in rear of its upturned end $d$ passes through an eye $d^3$ in the outer end of a coupling rod or link $d'$, which at its inner end is pivoted to a bracket $d^2$ on the tongue or main frame near the hinge, between said tongue and frame, so that as the forward edge or side of the machine-frame is raised or lowered said end of the link or rod $d'$ will rise or fall with it.

The inner end of the bar C is bifurcated, as indicated in Figs. 1 and 5 by shading, and strides the rod or bar D in close proximity to the crank-arm $C^2$, and is held in place thereon by a pin or bolt $c$, passing through the arms of the fork inside the bar D, and which bolt or pin may be readily inserted or removed for attaching the bar C to or detaching it from the bar D.

$c^3$ $c^3$ represent pins or stops for preventing the carrier from sliding on the bar D.
F indicates an obliquely-arranged bar, bifurcated at its inner end and secured to the bar D near its forward end by a pin $c'$ in a manner similar to that in which bar C is secured to said bar, said bar F extending obliquely outward and rearward, and being rigidly secured at its outer end to the bar C near its outer end in any suitable manner. The bars C and F are thus made to form a triangular platform-frame, upon which is secured and supported a platform F', on which the operator or attendant stands in convenient position for receiving the bundles from the machine and arranging or placing them on the tray of the bundle-carrier, the rear edge of the platform being just over the bar C.

The bar C has uprights $f$ and $f'$ secured to it, one near its inner end and the other near its outer end, and made preferably of bar-iron, with its ends turned inwardly toward each other, the lower ones $f^2$ forming feet, through which the bars $f$ and $f'$ are bolted to the platform F' and bar C, and the upper ones $f^3$ supporting a transverse connecting-bar F$^2$, bolted thereto, the bars $f$, $f'$, and F$^2$ forming in connection with the axle-bar C an upright frame for the attachment and support of the tray and parts operating in connection therewith, as will appear. Obliquely-arranged brace-rods $f^4$ and $f^5$ may be employed, extending from the forward edge of the platform F', back and up to the bars $f$ and $f'$, if desired, for stiffening and properly upholding said upright frame.

G indicates a single flat bar of iron bent into the rectangular shape indicated; but with the upper horizontal bar $g$ thereof turned on edge by twisting the bar at the ends thereof into a position at right angles to the rest of the bar. To this bar $g$ the flattened and perforated upper ends $g^2$ of a series of angular or L-shaped fingers $g'$ are bolted, said fingers passing down in parallel lines to the lower horizontal portion of the bar G, passing through perforations in said bar, after which they are bent rearward and form the platform G' of the tray of the bundle-carrier. The bent bar G and the vertical portions of the fingers $g'$ constitute the tray-head. This tray is left open at its inner side adjacent to the machine to facilitate the reception of the bundles therefrom; but the outer side is provided with a guard or fender consisting of a horizontal bar $g^3$, bolted at its forward end to the outer upright of the bar G and at its rear end to an upright $g^4$, which at its lower end is looped around the outer finger of the tray; or this guard may be made in the form of a sheet of metal or canvas H, stretched from the rod or bar $g^3$ to the outer tray-finger, as shown. The bar $g^3$ extends around the upright $g^4$, to which it is secured, and also around a rock-shaft $h$, and thence back to the bar G, to which it is secured, as shown in Figs. 1, 2, and 6. It thus forms an eye or bearing for said rock-shaft $h$, a second bearing for which is formed in a bracket $g^5$, attached to the upright $g^4$, near the lower end of shaft $h$. The shaft $h$ has two or more fingers $h'$ and $h^2$ attached to it, one at its lower and the other at its upper end, forming a tail-gate for preventing displacement of the bundles. The upper finger $h^2$ is extended beyond its pivot or shaft $h$ in bell-crank form, and the heel-extension $h^3$ thereof forms a lever, through which the shaft $h$ is rocked and the fingers $h'$ and $h^2$ vibrated, as will appear.

The bar C has eyebolts $i$ $i'$ passing through it horizontally at or near the ends thereof, the eyes on the rear end of which form bearings for links $j$ $j'$, either pivoted directly thereto or formed as crank-arms on a rod or rock-shaft J, journaled in said eyes, and having their rear outer ends bent to form wrist-pins $j^2$, which pass through perforations in the uprights of the bar G, near the lower ends thereof. The uprights $f$ and $f'$ on the bar C are perforated at or near the center of their length to form bearings for a rock-shaft J', having crank-arms $j^3$ $j^3$ at its ends and wrist-pins $j^4$ at the ends of the crank-arms, which engage eyes or perforations near the upper ends of the uprights of bar G, as shown. The arms $j^3$ are by preference slightly longer than the lower ones $j$ $j'$, thereby giving a somewhat greater throw to the upper end of the bar G, and the outer ends of the tray-fingers $g'$ or platform G' in such manner that when the latter is raised to receive the bundles it will incline the tray-head slightly forward and the fingers $g'$ slightly upward, and so tend to prevent accidental displacement of the bundles. These links $j$ $j'$ and $j^3$ $j^3$ in other respects act like the links of a parallel rule and cause the tray platform or fingers to rise and fall bodily. A spring K is connected at its upper end to one of the side uprights $f$ or $f'$ and at its lower end to the tray-head bar G, and its tension, when not overcome by the weight of the grain in the tray, is exerted to hold the tray up in position to receive the grain, and also to return the empty tray in position to receive the sheaves. One or more of these springs may be employed at each side of the tray if required. A bracket $l$ is attached to the outer upright $f'$, and a link L has its forward end pivoted to said bracket and its rear end is pivoted to the arm or lever $h^3$ on the rock-shaft $h$, this arrangement serving to automatically vibrate the fingers $h'$ and $h^2$ when the tray is raised and lowered, causing them to swing inward across the rear ends of the fingers $g'$, as shown in Fig. 1, for holding the bundles thereon when the tray is raised, and to swing outward to the position shown in Fig. 6 for permitting the free escape of the shock when the fingers are dropped down on the ground or stubble, as shown in Fig. 7, (full lines.)

M is a latch or lever pivoted in an upright $m$ on the platform F', and provided at its rear end with a pendent fork or arms or lips $m'$ $m^2$, between which the lower horizontal portion of the bar G enters when the tray is raised into position to receive the bundles.

The forward arm or lip $m^2$ is made longer than the lip $m'$, and as the tray-head rises, its lower bar comes in contact with the longer arm $m^2$ and crowds it forward, vibrating the lever M on its pivot until the lip $m'$ swings down behind and engages said bar. By the same movement the forward or long arm $m^3$ of the lever M is swung up, and the attendant presses it laterally into engagement with a shouldered standard M' on the platform F', where it will be held, locking the tray in its elevated position, until the bundles are properly arranged in a shock thereon, when the attendant by pressing the lever M laterally with his foot or otherwise out of engagement with the standard M' the tray will be free to swing rearward and downward on its links $j$, $j'$, and $j^3$ under the weight of the grain until the fingers $g'$ rest on the ground and are drawn from beneath the shock by the forward movement of the machine and returned to a receiving position by the spring K.

An upper longitudinal bar P of the binder-frame has a laterally-extending sleeve-bracket P', rigidly secured to its forward end, in which bracket a rock-shaft $q$ is journaled, having on its inner end a crank-arm Q, from which a link $q'$, adjustable in its connection with the pivoted tongue A', extends to the latter for rocking the frame of the machine on its carrying-wheels in a well known manner. The lever E is fast on the outer end of the shaft $q$, and extends to within reach of the driver in his seat on the machine, for enabling him to rock the machine as described, and thus raise and lower the cutters. The link $e$, referred to as connecting the forward end of bar D with said lever, is attached to the latter in rear of and above its pivotal rock-shaft $q$, and as said lever is vibrated to rock the main frame on its wheels for raising or depressing the cutters it serves at the same time to raise or depress the forward end of the bar D, and thereby to rock the bundle-carrier and shocker on the wheels $B^2$ and $B^3$, and so keep said bundle-carrier in proper working relation to the machine-frame and its operative parts.

The tray of the bundle-carrier, it will be seen, is located at the stubble side of the machine, in close proximity therewith and in position to receive the bundles as they are discharged from the binder-table, (indicated at R,) and from which they may be discharged upon the tray either by the usual bundle-discharging devices or by hand, as may be dictated by the character of the harvesting-machine or the preference of the operator. An attendant stands on the platform F' to receive and place the bundles to form a shock on the tray and in convenient position to trip the lever M and cause the discharge of the shock when completed.

The connection of the platform-frame bar C with the bars D and F permits the platform, supported at its outer end on wheel $B^3$, to follow the undulations of the ground at said end independently of the main frame of the machine, in a manner that will be readily understood.

I am aware that I am not the first to connect the upright head-plate of a bundle-tray with the truck-frame of a bundle-shocking machine by means of interposed parallel links, and I therefore do not claim such a combination of parts, broadly; but,

Having now described my invention, I claim as new—

1. The combination, with a harvester, of a bundle carrier and shocker having an independent carrying-wheel, the crank-arm on which said carrier is supported, interposed between the bundle-carrier and machine-frame, the bar D, to which the carrier is pivoted, and the lever E and interposed link $e$, for tilting said bundle-carrier relatively to the harvester, substantially as described.

2. In a harvester, the combination, with the main drive-wheel having a hollow axle, of a bundle-carrier having the crank-arm entering said hollow axle, the longitudinally-arranged bar D, connected therewith, the frame for supporting the carrier-platform hinged to said bar, and the lever for rocking the bundle-carrier platform relatively to the harvester, substantially as described.

3. The combination, with the main frame of the harvester, of the bundle-carrier-supporting frame, hinged to said main frame and having an independent carrying-wheel at its outer end, and also provided with the tray-head, as described, and a tray or bundle-carrier connected to said tray-head by pivoted links, substantially as described.

4. The combination, with the harvester and drive-wheel, of the pivotal rod or bar D, connected at one end by a pendent crank-arm with the drive-wheel axle and at the other with the main frame or tongue by a pivoted coupling-link, and the carrier-platform frame hinged to said bar D, substantially as described.

5. The combination, with the harvester, of the pivotal rod or bar D, the carrier-platform frame hinged thereto, the crank-arm connecting the bar with the drive-wheel axle, the pivoted link connecting said bar, and the lifting-lever on the harvester-frame, substantially as described.

6. The combination, in a bundle-carrier attachment to harvesters, of the upright carrier-platform-supporting frame, the upright tray-head, the tray-frame mounted thereon, the pivoted arms or links connecting said tray-head with the tray-frame, and the latch-lever for locking and releasing the tray-head, substantially as described.

7. The combination of the carrier-platform-supporting frame, the tray-frame mounted thereon, the bundle-tray, pivoted arms or links connecting said tray and tray-frame, the pivoted tail-gate or fingers $h'$ $h^2$ on the tray, and the link-connection between said gate or fingers and the tray-frame, substantially as described.

8. The combination, with the hinged carrier-platform-supporting frame, of the tray-frame mounted thereon, the bundle-tray, the links connecting the latter with the tray-frame, and the spring or springs also connecting said tray and frame, substantially as described.

9. The combination, with the harvester, of the bar D, connected at one end by a crank-arm with the axle thereof, the carrier-platform-supporting frame hinged to said bar D, the tray-frame mounted on the platform-frame, the links connecting said tray-frame and tray, the platform on said supporting-frame, and the latch-lever on said supporting-frame for engaging and upholding the tray, substantially as described.

10. The combination, with the bundle-tray and the frame supporting said tray, of the upper and lower parallel links or arms connecting said tray and frame, the upper links being made longer than the lower ones, substantially as and for the purpose described.

11. The combination, with a harvester, of the bar D, connected to the axle thereof, the bundle-carrier frame hinged at its inner end to the bar D, and supported at its outer end on an independent carrying-wheel, and a bundle-tray provided in front with a head and at its outer side with a tail-gate or fingers for supporting the bundles, and left open on its inner side for the reception of the bundles from the harvester, substantially as described.

12. The combination, in a bundle-carrier attachment to harvesters, of the platform-carrying frame, the bundle-carrying tray, the upright frame F F′ $f f'$, mounted on said platform and supporting said tray, the operator's platform on the frame in front of the tray, and the latch-lever located on said platform, substantially as described.

13. The combination, with a harvester, of a lever for rocking said machine on its carrying-wheels, as described, a bundle-carrier attachment having a hinged connection with said harvester, and a link or rod connecting said lever and said bundle-carrier attachment for rocking the latter on its hinged connection and giving it proper working position under different adjustments of the main frame, substantially as described.

In testimony whereof I have hereunto set my hand this 2d day of November, A. D. 1888.

LEWIS MILLER.

Witnesses:
  O. L. SADLER,
  W. K. MEANS.